United States Patent
Aronson

[15] 3,656,518
[45] Apr. 18, 1972

[54] METHOD AND APPARATUS FOR MEASURING AND DISPENSING PREDETERMINED EQUAL AMOUNTS OF POWDERED MATERIAL

[72] Inventor: Theodore F. Aronson, Glen Cove, N.Y.

[73] Assignee: Perry Industries, Inc., Hicksville, N.Y.

[22] Filed: Mar. 27, 1967

[21] Appl. No.: 626,083

[52] U.S. Cl. .................................... 141/1, 86/31, 141/12, 141/67, 141/81, 141/167, 141/181, 141/242, 222/194, 222/218, 222/345
[51] Int. Cl. ......................................................... B65b 1/16
[58] Field of Search ................... 73/423 A; 141/1, 12, 67, 81, 141/86, 144, 167, 168, 170, 181, 191, 234, 237, 238, 242, 250, 258, 260; 222/1, 194, 216, 218, 219, 221, 342, 344–346, 349, 352, 440, 386; 86/31

[56] References Cited

UNITED STATES PATENTS

| | | | |
|---|---|---|---|
| 3,339,595 | 9/1967 | Pechmann | 141/67 |
| 858,167 | 6/1907 | Erd | 222/386 |
| 2,263,845 | 11/1941 | Hartsell | 222/386 UX |
| 2,342,040 | 2/1944 | Davis | 222/349 X |
| 2,362,791 | 11/1944 | Ayars | 141/86 X |
| 2,888,963 | 6/1959 | Guyer | 222/218 X |
| 2,932,330 | 4/1960 | Donofrio | 141/181 X |
| 3,118,575 | 1/1964 | McCauley | 222/349 |
| 3,312,151 | 4/1967 | Molins | 222/194 UX |
| 3,353,722 | 11/1967 | Mehte | 222/218 |
| 3,371,689 | 3/1968 | Carruthers | 141/81 |
| 3,384,268 | 5/1968 | Egee et al. | 222/218 X |

FOREIGN PATENTS OR APPLICATIONS

| | | | |
|---|---|---|---|
| 84,162 | 8/1957 | Denmark | 222/218 |

Primary Examiner—Edward J. Earls
Attorney—Irving Seidman

[57] ABSTRACT

Measuring and dispensing equal predetermined amounts of powdered material with a measuring chamber having a piston means movably mounted therein for movement between a retracted loading position and a protracted discharging position. The head of the piston means is formed of a porous material which is pervious to a gaseous medium, but impervious to the powder to be measured and dispensed. Charging of the measuring chamber with a measured amount of powdered material is attained by drawing a vacuum on the chamber when the piston is displaced to a retracted loading position. Dispensing of the measured powder charge from the measuring chamber is attained by effecting displacement of the piston toward a protracted discharging position to push the measured charge of powder in front of the piston out of the measuring chamber. Positive separation of the measured charge from the end of the piston head is attained by applying a force of positive fluid pressure on the end of the piston head in the protracted position to dislodge the powder charge therefrom.

This invention further contemplates the inclusion of a means and step for effecting additional compaction of the powder charge of evacuated density within the chamber prior to the ejection of the powder charge therefrom. This is attained by positioning the chamber charged with a measured amount of powder at evacuated density adjacent an anvil means, and thereafter effecting displacement of the piston a predetermined amount with controlled pressure to compress the powder charge at evacuated density between the piston head and the anvil means to form a compacted powder slug. The ejection of the compacted powder slug is attained by further advancing the piston head to a protracted or ejected position relative to the chamber, and blowing the slug from the piston head by applying a pulse of positive fluid pressure to the end of the porous piston head.

This invention further contemplates various means for enhancing the doctoring of any excess powdered material from the end of a measuring chamber during a vacuum filling or charging operation to assure completely accurate predetermined measurement on each charging operation.

31 Claims, 33 Drawing Figures

PATENTED APR 18 1972

INVENTOR.
Theodore F. Aronson

BY
Irving Seidman
ATTORNEY

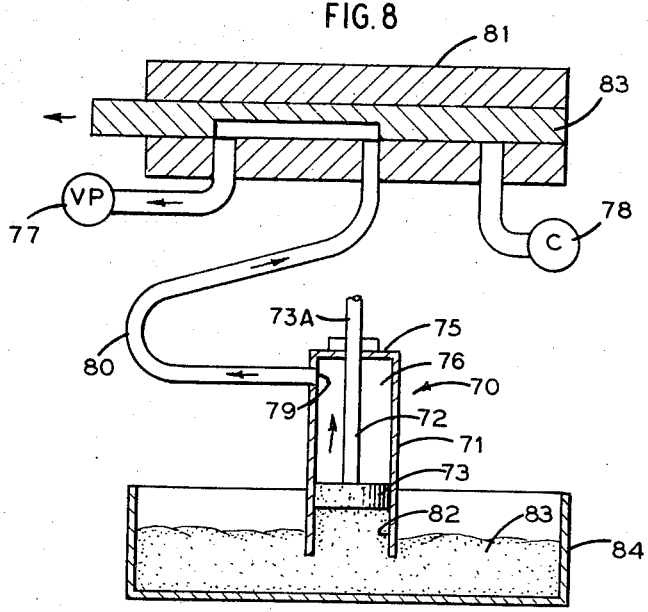
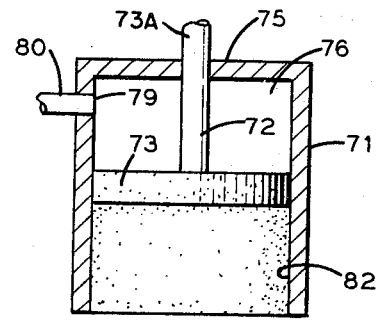
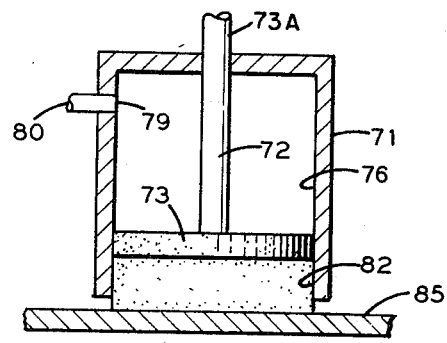
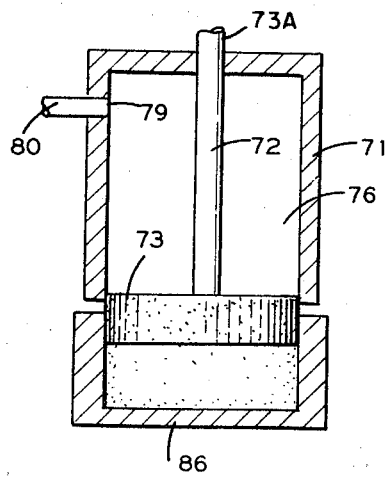
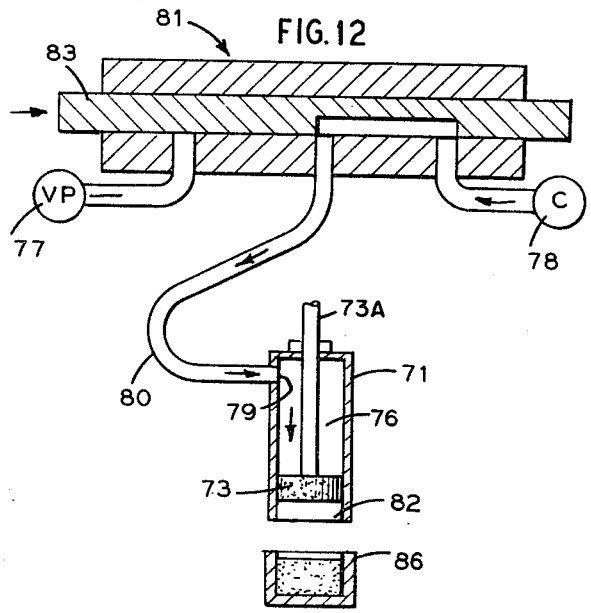

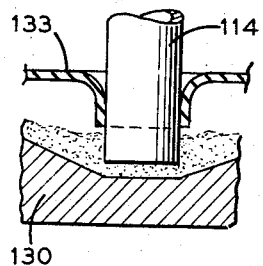
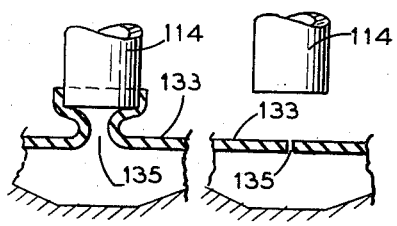
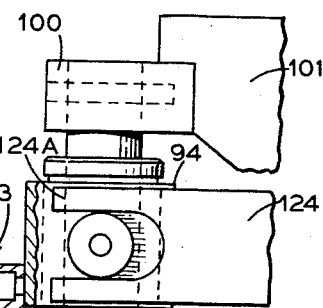
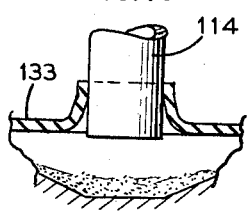
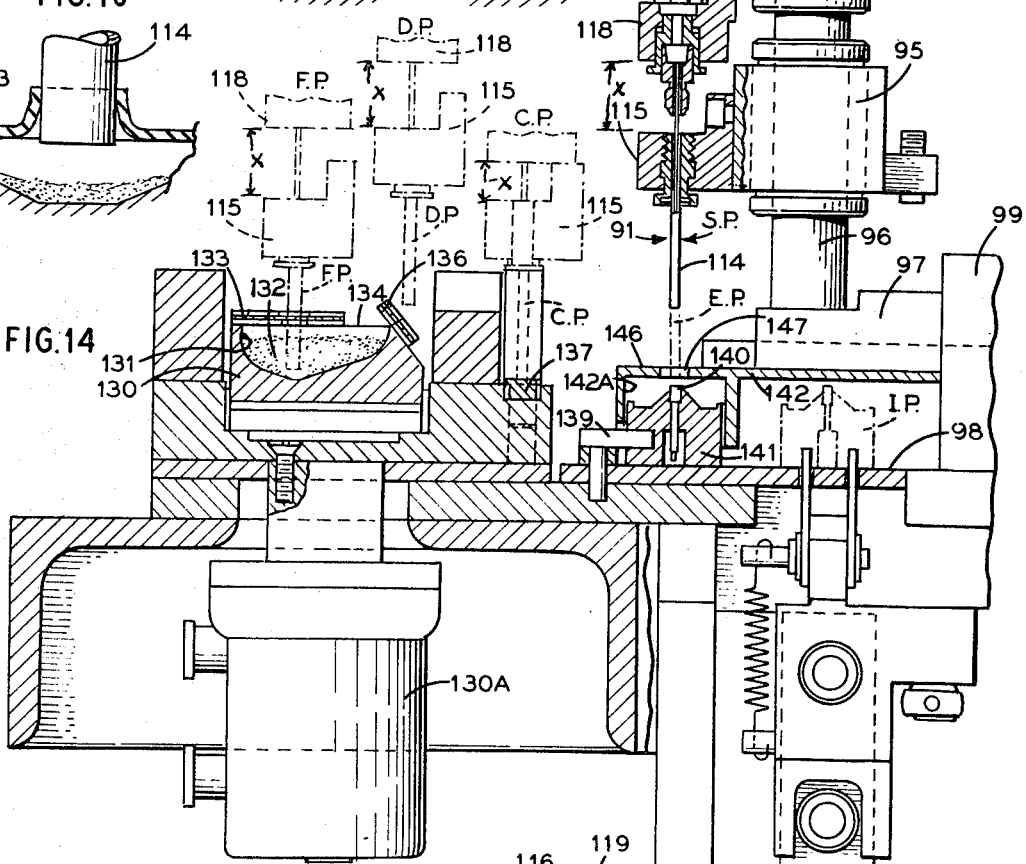
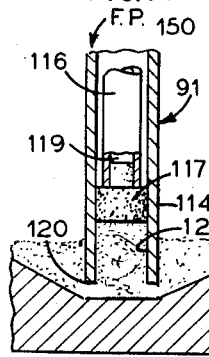
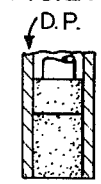
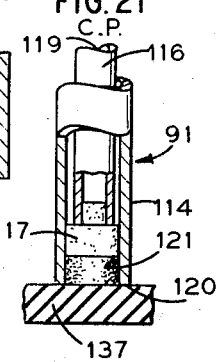
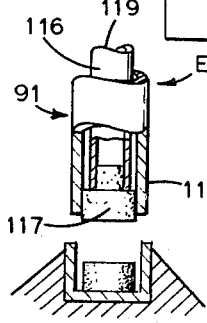

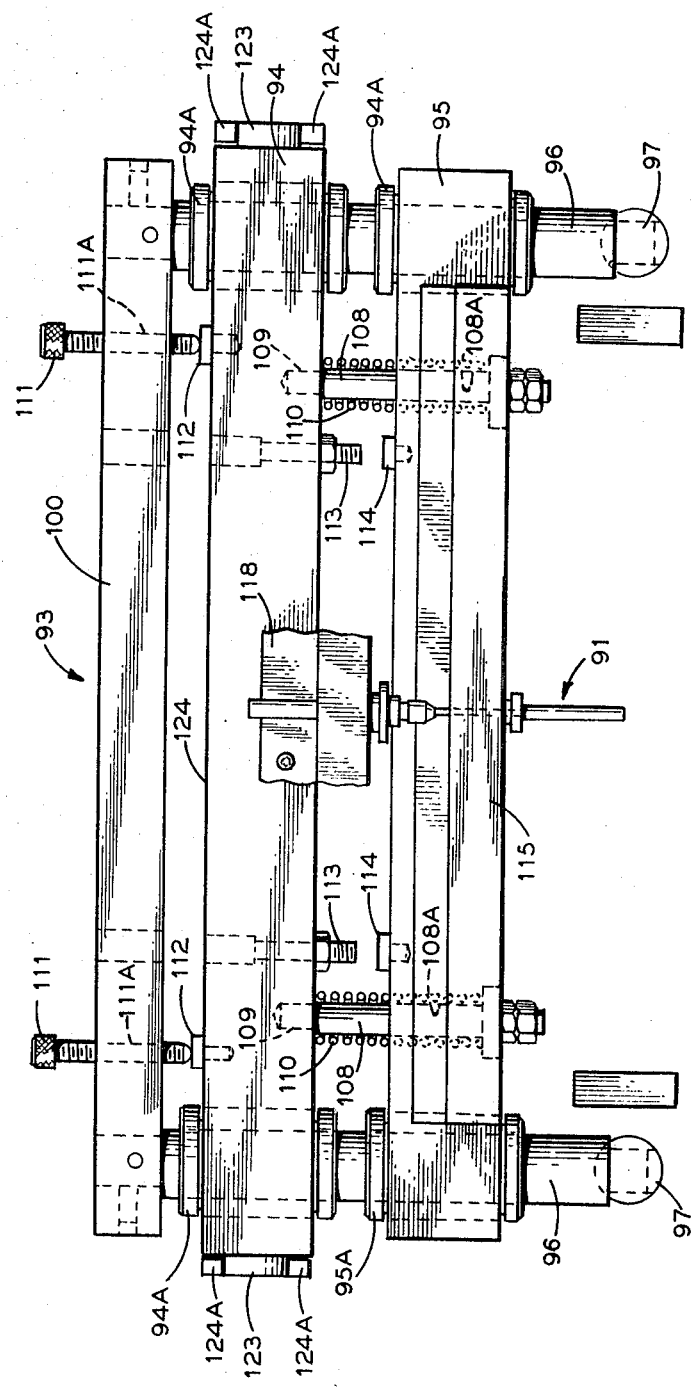

METHOD AND APPARATUS FOR MEASURING AND DISPENSING PREDETERMINED EQUAL AMOUNTS OF POWDERED MATERIAL

This invention relates to a method and apparatus for measuring and dispensing equal predetermined amounts of a powdered material, and more specifically to improvements in the method and apparatus disclosed in U.S. Pat. No. 2,540,059 for vacuum chamber volumetric measuring and dispensing of powdered material.

THE PROBLEM

Optimum measuring and dispensing of powdered material into containers involve many different considerations as, for example, production rate, fill accuracy, freedom from dusting, final conditioning of the powder, physical characteristics of the powder, size and shape of the container, and its opening, among others. One of the primary considerations in dispensing and handling of powdered material is the "fill accuracy," that is, how close to the actual required weight and specifications a given powdered material can be consistently and positively measured and dispensed. The "fill accuracy" factor becomes especially critical in the measuring and dispensing of powdered materials as, for example, medicinal drugs, propellant or explosive-type powders, and other powdered materials wherein the precision of the measured charge or dose is not only a function of the cost of the product, but also a critical basic control consideration in the final assembly of a product in which the measured powder charge constitutes but a part.

Another important consideration in any powder filling and dispensing operation is attaining freedom of dust contamination of the atmosphere, of the container, and/or of the machinery effecting the measuring and dispensing operation. Analogous to this problem of dusting is the further consideration of depositing the powder charge into the final container, and the final form which the powder charge is required to take in the container. For example, some powder charges disposed within a container need be only contained in loose or fluffy state, such as talcum powders. Other powders may be required to be consolidated or compacted under specific pressures, as, for example, explosive powders when they are placed in a detonator cap or the like. Another important consideration in the handling of powdered materials as, for example, the explosive powders, is their sensitivity to pressure, abrasion, and/or generated heat.

The term "powders" as herein used covers a range of particles varying in size from several microns up to and including granulars of as much as a quarter of an inch or more in diameter. A powder may be a free-flowing powder which can be poured, as, for example, dry sand. Otherwise defined, a free-flowing powder is one which forms a pile resembling a very flat cone when it is poured in a stream onto a horizontal surface. Typical free-flowing powders are coffee, granulated sugar, table salt, propellants whose particles are in the shape of balls, flakes or rods and other explosives which may be in the form of coarse granulars or the like. In general, particle sizes in this category range from a low limit of 200-mesh up to the 4-mesh range, and are generally uniformly smooth, and hard in nature.

A non-free-flowing powder may be defined as that powdered material that will tend to bridge or arch when it is placed in a hopper or funnel unless special conditions such as vibration or aeration are made to occur. Generally non-free-flowing powders will pack into a solid mass in a container under their own weight, or during vibration or transport. This category includes such materials as talcum powder, confectionery sugar, toners, propellants, such as fine black powder and explosives in very fine particle sizes. These particle sizes range from a high limit of 250-mesh and below.

Certain powder, regardless of their flow characteristics, may be classified also as sensitive powders, i.e., powders sensitive to abrasion, pressure, or heat. Many powdered drugs meant for ultimate use as injectibles are considered sensitive because they will tend to conglomerate or form clumps, if subjected to rough handling or pressure. Usually these clumps cannot be dissolved or passed through a hypodermic needle. In the case of propellants and explosives, abrasion, pressure or heat may result in an incident of destroying the equipment or sections of it, and this factor becomes a prime overriding parameter in determining how such material can be best handled.

PRIOR SYSTEMS

Heretofore, many systems and methods have been used in an effort to accurately measure and dispense predetermined amounts of various types of powdered material. However, each has its own limitations and disadvantages. For example, net weighing fillers comprise that type of apparatus wherein the material to be dispensed is actually weighed. While net weighing fillers have proved to be extremely accurate, they are extremely slow in operation. The net weigher apparatus generally includes very precise weighing means that may be either mechanically and/or electrically controlled, for directly controlling the net weight of the material being dispensed. These net weighers include a feeder to move the material from a source of supply to a weighing pan where it is monitored until the required weight is obtained. Feeding of the powdered material to weighing pans has been accomplished by vibrating chutes, rotary feeders, belt conveyors, auger means, and the like. The charge accumulated on the weighing pan is then released through a funnel into a container. Accuracy with this system has been further aided by the added provision of a dribble feed. Where dribble feed has been used most of the material is first fed to the weighing pan at a high rate. Then, as the prescribed weight approaches its final limit, as determined by mechanical and/or electronic controls, the fast feed is transformed to a slow dribble feed. The balance of the material is then fed slowly onto the pan until the desired pre-established weight is attained. Sensing of the final weight has been by mechanical scales, pivoting light beams, or electronic scales and other like devices. Manual weighing procedures have also been utilized to control the feed rates by observing markings on a sensitive scale balance, whether of the direct or shadow type scales. However, reliability and accuracy of this method at best is left to chance as it is conditioned on the judgment of the operator.

Semi-automatic and fully automatic weighing and check weighing systems have also been built around the basic balances. However, these systems define a relatively delicate, complex, sensitive, and costly mechanism.

The limitation of net weight fillers is that they are adapted primarily for weighing of free-flowing materials, as the principles on which the net weighers operate virtually negate their use in handling non free-flowing or sticky powdered materials. The critical requirements of accuracy necessitated in the measuring and handling of military propellants and explosives require additional check weighing in tare cups in subsequent inspection operation. However, net weight fillers, despite their known drawbacks and their delicacy of adjustment, low rate of production, and relatively high cost of installation have heretofore been widely used for propellant filling.

Another method heretofore used in handling various powders was the gravity volumetric type of filler. This is perhaps the simplest and least expensive of the known powder fillers. However, the simplest volumetric fillers are limited to free-flowing powders and consist simply of pouring a powder into a container to a point of overflowing. To eliminate the probability of voids caused by unfilled air pockets during a filling operation, the container is vibrated to shake down material and thereby eliminate the voids. The overfill or excess of the material is then doctored off, and the container so dressed is then determined to contain the desired predetermined measured charge of powder. The accuracy of straight volumetric-type fillers is thus influenced by the ultimate uniformity of density of the material being measured. In the case of completely free-flowing powders, it is possible with a fair degree of reliability to eliminate the voids. However, inaccuracies are inherent with this type of system because the range in density experienced due to random outside factors, such as vibration of the container, or powder which affects an impaction as it is poured into the container.

In hazardous powdered filling operations a spoon or scoop is inserted into the powder supply and as it is withdrawn, the excess is doctored off to form a level scoop. The level scoop is then dropped into a funnel for transfer to the final container. However, any sticking of the powder to the scoop destroys any useful accuracy which can be obtained by this method. Hence the method can only be satisfactorily used for free-flowing powder. Because of the simplicity of this approach, the ease of changing the measuring cup, and the openness of the operation, this method has been used in many past and present installations for propellant and other free-flowing powder feeding.

Another method which has been employed in the past is that of auger feeding. The principle of an auger filler is that in one revolution of an auger it pushes only so much material out of the hopper and into the container. The preceding section of the auger has theoretically brought the powder to a uniform density and avoided the inclusion of voids. The action of the auger, in combination with agitation, tends to deaerate powders and compact the powders in a control density within the auger tube. The auger is operated generally by a clutch-brake drive, and controlled either by a timer or a counter. The object of the auger has been to deliver a given volume of powder per revolution, that will compare favorably from revolution to revolution on a weight basis. The auger system has been used for both free-flowing and non-free-flowing powders. However, the auger method has not found much favor in the loading of hazardous powders because of its inherent mode of operation. The auger method develops high pressure points in the auger tube as the auger rotates, as well as the unavoidable abrasion of the powder by the auger surface, and between the auger edges and the inside walls of the auger tube. Utilization of the auger feeder on insensitive materials, such as drugs and toners has, in the past, also resulted in the formulation of conglomerates due to the heat and pressure generated by the system. Auger feeds on small weight charges at a good "fill accuracy factor" are further complicated by the random break-up of the completed fill from the bulk supply when the auger stops rotating. For example, the point along the incline screw at the end of the extrusion may be within the tube, whereas for non-free-flowing material the break-off point may fall beyond the end of the tube. When in use on free-flowing material, the material may continue to flow to some indeterminate point back inside the screw and tube after the auger motion ceases.

Another method which has been used is the control rate of flow fillings. This is a simple free-flow filler that has usually been considered one of the least accurate types of powder fillers. Rate of flow in such methods is established by a vibratory feeder, i.e., a tray-type unit operated at a pre-set amplitude and frequency, or by gravity flow through an adjustable orifice, or by a series of buckets arranged about a circumference of a wheel dumping at the top of its rotation. Generally the powder measured by such control rate flow is passed through a funnel or other like means to a container. With a constant time cycle, such controlled rate feeders put more or less the same amount of material into each container.

Such control rate feeders have been used in the loading of highly sensitive explosives because no sliding surfaces which can abrade the powder are present in this system. However, this system is subject to the disadvantages of dusting, inaccuracies due to density variations and flow rate characteristics of the powder, and that the execution of this approach usually results in a rather complex and expensively machined apparatus whose accuracy reliability is always uncertain. Also, such control rate of flow fillers are limited to those powders or mixtures which must have not only extremely good flow characteristics but also must have the consistency of this same characteristic.

Vacuum container volumetric filler has been another system tried to effect optimum filling results. In this system a vacuum is drawn on the container through a screen sealed at the top of the container. The powder is then drawn into the container through a hole formed in the screen. However, the disadvantages of this system in some applications is the fact that the fill weight is affected by variations in the volumes of successive containers. This is over and above the weight variations that may exist due to any variations resulting in the evacuated density of the powder so that accuracy of this system depends not only on maintaining uniform density of the powder, but also on the volumetric accuracy of the container as well.

Thus, in the past considerable difficulty had been noted in attempts to get uniform charges of powdered material at required production rates which would consistently measure and dispense powders to meet specific tolerances. In the field of handling and filling powdered drugs, pharmaceuticals, and explosive powders into their respective containers, it is absolutely essential that precise dosages be attained with a maximum degree of certainty and reliability. Also many powders, as for example, various explosive powders, in their final deposited form, have to be consolidated to approximately 10,000 to 20,000 p.s.i. before subsequent charges are placed or operation performed. In many of the known methods and systems of powder filling, air is entrapped by the powdered material so that the powder in its normal fill density results in a volume which may overflow the container into which the powdered material is to be confined. In such events it was necessary to place into use a funnel means which sealed to the top of the container, the funnel being provided with circumscribing wall portions corresponding in size to the inside diameter of the container. Thus, the given quantity of powder in its loose form is confined to the container adapted to contain it and the connected funnel, whereupon a consolidating ram is thereafter used to compress the quantity of powder into the container. However, such method of filling containers with powdered material and more particularly, with explosive powders, increased the danger of explosion and fire incidental to the inherent friction and abrasion occuring between the ram diameter, and the walls of the funnel and connected container during the compressing operation. As such powder in loose form tends to coat the funnel and the sides of the container, the danger of explosion is further enhanced as the ram descends to compress the powder.

OBJECTS

It is, therefore, an object of this invention to provide a method and apparatus for measuring and dispensing powdered material in which a slug of powder of evacuated density is formed in a measuring chamber and which slug is mechanically ejected from the measuring chamber so as to be deposited within a container of predetermined size which is equal or larger than the slug.

Another object of this invention is to provide an improved method and apparatus for vacuum-chamber-volumetric measuring and dispensing of powdered material in which the density of the material is increased to a density which is greater than that of the initial evacuated density of the measured material prior to discharge and insertion of the measured amount of powder into the container adapted to contain it.

Another object of this invention is to provide a method and apparatus for dispensing predetermined equal amounts of powdered material by forming a given quantity of loose powdered material into a compact slug of a size which will completely fit inside a container having a volume which would not normally accommodate the volumetric amount of the powder making up the slug in its loose form.

Another object is to provide a method and apparatus wherein a predetermined amount of powder can be precisely and accurately deposited within its container without dusting.

Another object of this invention is to provide an improved method and apparatus whereby highly dangerous and explosive powders may be measured and dispensed as pre-compacted slugs into a container having a volume which is less than the volume of the measured powder in its loose form.

Another object of this invention is to provide for improved doctoring techniques for removing excess material from the end of a measuring chamber of a vacuum chamber volumetric filler to further enhance the accuracy of such filler.

Another object of this invention resides in an improved vacuum chamber volumetric filler in which the measured amount of powdered material of evacuated density is further compacted within the measuring chamber prior to the discharge of the material therefrom.

Another object of this invention is to provide in a vacuum chamber volumetric type of filler, means for forcibly ejecting the measured amount of powdered material therefrom so as to precisely position the ejected material at the point of discharge with a minimum of dusting.

Another object of this invention is to provide means for positively effecting the simultaneous release of the measured quantity of powdered material from the measuring chamber and purging of the chamber.

BRIEF DESCRIPTION

The foregoing objects and other features and advantages of this invention are attained by a method of forming and dispensing equal predetermined amounts of a powdered material comprising the steps of positioning an open end measuring chamber having a movable piston therein adjacent to a supply of powdered material and charging the chamber with a volumetric measure of material corresponding to the volume of the chamber. The measured powder in the charge chamber can then be ejected by advancing the piston. If further compaction of the charge is desired, the charged chamber prior to ejection is positioned adjacent an anvil means. With the measured amount of powder confined between the retracted piston within the chamber and the anvil means, the piston is displaced toward the anvil means a predetermined amount under controlled pressure for compacting the measured charge of powder between the anvil means and the displaced piston to form a compact slug. The compacted slug is then ejected from the chamber at a point removed from the anvil means by further displacement of the piston within the chamber. Initial charging of the chamber may be effected by vibrating the powder supply to attain a uniform density and placing the chamber into said powder supply or by drawing a negative pressure thereon, thereby drawing the volumetric amount of loose powdered material thereinto. The powdered material so charged is maintained within the chamber either by friction or at an evacuated density by maintaining the negative pressure on the chamber. Positive separation of the compacted slug from the projected position of the piston is effected by changing the negative pressure operating on the slug to a positive fluid pressure, whereby the latter effects separation of the slug by blowing the slug free of the piston head.

To ensure even more accurate measurement of the volumetric amount of powder within the chamber, the excess is doctored from the end of the chamber upon initial charging of the chamber.

An apparatus by which the foregoing method may be accomplished comprises essentially of a means defining an open-end chamber in which a piston is mounted for relative movement between a retracted loading position and a protracted discharging position. The piston means comprises a porous piston head in sliding engagement with the walls of the chamber and which is impervious to the powdered material to be measured, but pervious to a gaseous medium. An actuating means is operatively connected to the piston means to effect movement thereof between the retracted loading position and the protracted discharging position. In order to effect the charging of the measuring chamber when it is disposed adjacent a supply of loose or flowable powdered material, a means is provided for applying a negative pressure on the piston head when in the retracted loading position thereof. By so doing a predetermined amount of the powdered material is evacuated into the chamber due to the vacuum formed thereby. The degree of vacuum pulled on the chamber determines the initial evacuated density of the powder charge contained within the measuring chamber. Discharge of the measured amount of powder is effected by advancing the piston.

To further compact the charge of powdered material within the chamber to define a slug having a density greater than the initial evacuated density of the charge, an anvil means is disposed against the open end of the charged measuring chamber to define an enclosure therefor, and the actuating means is rendered operative to effect relative displacement between the piston means and anvil means whereby the charged volumetric amount of material within the measuring chamber is further compressed therebetween.

To discharge the compacted slug from the measuring chamber the anvil means is removed, and the piston advanced to its protracted position. A means is provided for imparting to the piston a stream of fluid under positive pressure to ensure positive separation of the compacted slug from the piston in the protracted discharging position thereof.

In accordance with this invention the measuring chamber means may take the form of either a rotating filling head turret in which a plurality of similarly constructed measuring chambers are circumferentially spaced about the peripheral portion of the turret head, each containing a movable piston, or a gun in which the barrel portion of the gun defines the measuring chamber, and the piston rendered movable relative to the barrel portion to effect the loading and discharging of the powdered material.

In accordance with this invention, the accuracy of the volumetric amount of powder charged in the measuring chamber can be rendered more absolute by providing means for effectively doctoring any excess material which may tend to adhere to the end of the charged chamber when the same is loaded under conditions of negative pressure.

A feature of this invention resides in the provision of a method, and an apparatus for performing and same wherein a slug of powdered material at evacuated density is positively ejected from its measuring chamber with a maximum degree of direction and control and a minimum of dusting.

Another feature of this invention resides in the provision of a method and apparatus for performing the same in which a slug of powder at evacuated density can be further compacted within its measuring chamber prior to discharging the slug therefrom.

Another feature of this invention resides in the method and apparatus for forming a slug of powdered material of predetermined density containing a volumetric measure of powdered material which could not in its loose form be normally containable within a given size container.

Another feature of this invention resides in a method and apparatus whereby a slug of powdered material of evacuated density or greater can be precisely positioned where desired without effecting dusting and/or contamination of the atmosphere or equipment.

Another feature of this invention resides in a method and apparatus whereby a container of given volumetric size may be charged with a volumetric amount of powdered material which in its free or loose state is greater than the volume of the container in which it is to be disposed.

Another feature of this invention is to provide a method and apparatus which is capable of satisfactorily handling highly dangerous and explosive powders in a manner in which the tendency and hazard of explosion is substantially minimized.

Another feature of this invention resides in the provision of improved doctoring means for eliminating any excess of powdered material which tends to adhere to the end of a powdered charge contained within a measuring chamber.

Another feature of this invention resides in the provision wherein a stream of fluid medium under positive pressure is utilized to effect positive separation of the slug of powdered material from the ejecting piston means in discharging it from the chamber.

Other features and advantages will become more readily apparent when considered in view of the specification and drawings in which:

FIG. 8 is a diagrammatic showing of the invention as applied to a measuring gun.

FIG. 9 illustrates diagrammatically the charging of the measuring gun with a predetermined volumetric amount of powdered material.

FIG. 10 illustrates diagrammatically the compaction of the volumetric charge of powdered material within the gun to attain a slug having a density greater than the initial evacuated density of the charged material.

FIG. 11 illustrates diagrammatically the metering or measuring gun in the discharging position thereof.

FIG. 12 illustrates diagrammatically the release of the compacted powdered slug from the end of the piston.

FIG. 14 is an enlarged fragmentary sectional side view of the apparatus of FIG. 13 having portions shown in section and in which the several positions of the metering gun are illustrated in dotted lines to the various positions thereof during a machine cycle.

FIG. 15 is an enlarged detail showing illustrating the end of the measuring gun inserted into a supply of bulk powdered material.

FIG. 16 is an enlarged detail illustration similar to FIG. 15 but illustrating a relative position of the parts upon withdrawal of the measuring gun from the bulk powder supply.

FIG. 17 is a view similar to that of FIG. 16 but illustrating the manner in which doctoring any excess of powdered material from the end of the measuring chamber is attained.

FIG. 18 illustrates the measuring gun in a fully retracted position from the powder supply.

FIG. 19 illustrates a detail sectional view of the metering gun of the apparatus of FIGS. 13 and 14 in the charging station thereof.

FIG. 20 illustrates the metering gun charged with a powdered material, and doctored of excess material.

FIG. 21 illustrates the relative position of the metering gun parts in the compacting station of the apparatus.

FIG. 22 illustrates the arrangement of parts in a discharging station of the apparatus.

FIG. 24 is a fragmentary detail showing of the gun mount of the apparatus of FIG. 13.

Figure 1:
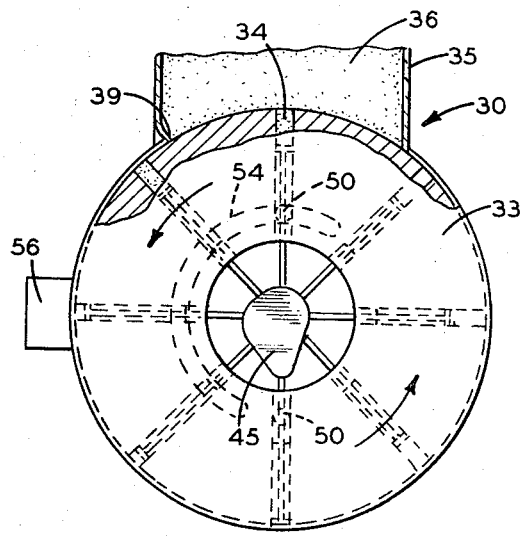
FIG. 1 is a fragmentary sectional view of the apparatus embodying the present invention, taken along line 1—1 on FIG. 2.

With the method and apparatus to be hereinafter defined, almost any material of a powdered nature may be measured and dispensed with a maximum degree of accuracy and precision. Among such powdered products are various pharmaceuticals, e.g., sulphur drugs, powdered vitamins, and the like, other dry powders or chemical materials such as sugar, salt, gun powder or other highly explosive powders, as, for example, a Class E, HMX, Grade 2, PVA Lead Azide, Lead Styphnate, tracer powder mixes, pyrotechnic smoke mixes, and the like. Powdered material as hereinafter used is defined as any aggregation of loose materials of small solid particles including not only ground, but also crystalline material, flaky material, or other material of small particular size. It is not necessary that the material be homogeneous. The basic requirement is that the material be reasonably free to flow, and that the material have sufficient rigidity so that it can be packed in a metering or measuring chamber, and which charge of material can then be retained within its measuring chamber by maintaining a negative pressure or vacuum on the chamber. The method of this invention for accurately measuring and dispensing a powdered material in equal predetermined amounts upon each loading and dispensing operation comprises the step of positioning an open end measuring chamber having disposed therein a piston movable between a retracted loading position and a protracted discharging position into a supply of bulk powdered material. The head of the piston is formed of a material pervious to a fluid medium, but impervious to the powdered material. In the loading position of the chamber, the piston is retracted to a loading position to define in the end portion of the measuring chamber a volume corresponding to the volumetric measure of the powdered material to be measured and dispensed. The measuring chamber is charged or filled with a quantity of powdered material. This charging is attained by subjecting the measuring chamber to a condition of negative pressure whereby the powdered material can be readily sucked into the measuring chamber from the bulk supply wherein the evacuated density of the volumetric amount of material being charged into the chamber, is determined by the degree or force of vacuum being pulled thereon. The measuring chamber is then removed from the supply of bulk powdered material while maintaining the negative pressure thereon, thereby retaining the measured powdered charge material within the chamber. In removing the charged measuring chamber from the powder supply, the end of the chamber may be doctored or dressed to remove any excess of powdered material which tends to adhere or extend beyond the measured volume of the chamber. In this manner an even volumetric charge of material is precisely retained in the measuring chamber upon each loading operation.

The present method further contemplates the positioning of the charged and dressed or doctored chamber adjacent an anvil or compacting means which defines a closure for the open end of the measuring chamber. In this position the piston is advanced toward the anvil means a predetermined amount to compress therebetween a volumetric measure of powdered material at evacuated density within the chamber prior to discharge. Displacement of the piston thus effects a compaction of the powdered charge of material within the chamber to form a powder slug having a density greater than the initial evacuated density of the powder charge. Upon compaction of the powdered material within the chamber to form the slug, the slug is dispensed from the measuring chamber by moving the chamber to a point remote from the anvil means.

Positive discharge of the slug from the measuring chamber is effected by further displacement of the piston to its protracted discharging position. Preferably the discharging operation is accomplished when the open end of the metering chamber is disposed immediately above the open end of the container adapted to receive the powdered slug. Positive separation of the powdered slug from the protracted piston is attained by applying a stream of fluid under positive pressure to the piston head. The result is that the slug is blown cleanly and freely from the piston. The pulse of high-pressure fluid medium acting on the piston to separate the slug also functions to purge the piston of any powdered particles tending to adhere thereto, thereby insuring that the accuracy of the measured charge is maintained throughout a series of successive filling and dispensing operations.

The foregoing method may be automatically performed by a powder filling and dispensing apparatus in which the metering or measuring chamber is included in a rotating turret filling head or formed in the nature of a filling and dispensing gun as will be hereinafter described.

Figure 2:
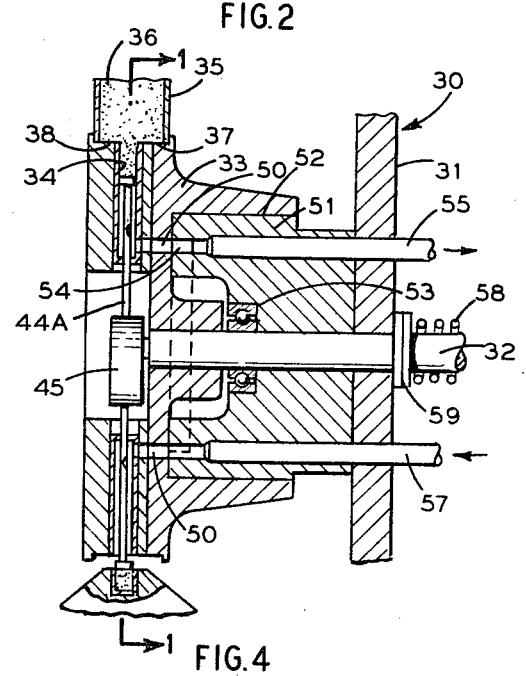
FIG. 2 is a front elevation view of a fragmentary portion of the apparatus disclosed in FIG. 1.
Figure 3:
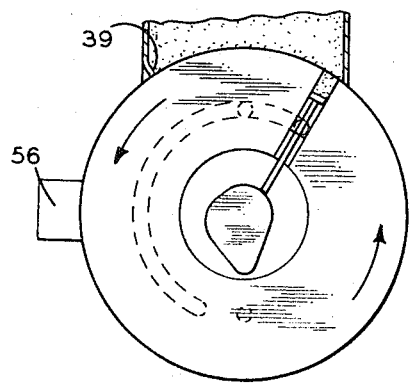
FIG. 3 is a schematic illustration of the apparatus of FIGS. 1 and 2 showing the initial filling position of the measuring chamber.

One apparatus embodiment FIGS. 1 to 5 and 25 by which the foregoing method may be performed comprises a filling and dispensing machine 30 utilizing a turret filling head of the type disclosed in U.S. Pat. No. 2,540,059, but modified in accordance with this invention. Such an apparatus comprises essentially a supporting frame 31 on which the respective component portions of the apparatus may be supported. Suitably journaled on the frame 31 is a shaft 32 which has mounted thereon the rotary turret filling head 33 with one or more filling or measuring chambers 34. As illustrated in FIGS. 1 and 2, the filling head turret 33 is illustrated with a plurality of similarly constructed measuring chambers 34. Universally mounted immediately above the filling head in a manner similar to that described in U.S. Pat. No. 2,540,059 is a hopper 35 adapted to contain a supply of bulk powdered material 36. If desired, a suitable stirrer (not shown) may be provided in the hopper 35 to effect agitation of the powdered material to ensure positive flow. As there is a tendency for fine powders to escape between the discharge opening 37 of the hopper 35 and the turret filling head 33, the surface 38 of the filling head is preferably ground to a high polish and lapped with the contacting members of the hopper 35 so that a very fine fit is obtained between the hopper and the periphery of the turret head. As described in U.S. Pat. No. 2,540,059, the hopper 35 is mounted on a lever which in turn is journaled upon the frame member and held in position with a spring. By flexibly journaling the hopper 35 about a stirrer shaft (not shown), the hopper 35 is then free to move small incremental amounts in any direction so that any eccentricities or deviations in the alignment of the filling head 33 are compensated so that the hopper seals powder-tight. As shown in the drawings, a doctor blade 39 is disposed adjacent the edge of the hopper 35 in the direction of rotation so that the charge of powder filling the respective metering chambers 34 as the turret head 33 rotates is dressed down, evenly to the surface of the filling head turret. In this manner, any excess of powder material which tends to adhere to the end of the metering chamber 34 is returned to the bulk powder supply. By dressing the top surface, each individual charge of the respective chamber defines an identical volume and because of the peculiar and unexpectedly uniform density of the powder material, and quantity of each individual charge has been found to be remarkably consistent and uniform. With routine care, the charging of each of the respective chambers 34 can be easily kept within negligible error of the desired value.

As disclosed in FIG. 1 the respective metering or measuring chambers of the filling head is defined by a sleeve 40 which is lapped to match the complementary bore 41 formed in the filling head 33 adapted to receive the same. Slidably mounted within the sleeve 40 is a piston means 42 comprising a piston head 43 and a connected piston rod 44. As shown, the piston rod 44 extends radially through the sleeve and toward the center of the turret head 33. The inner end portion of the piston rod 44 defines a cam follower 44A end which is adapted to ride or bear on a stationary cam 45. Suitable spring means 46 may be provided to bias the respective piston rods 44 against the contour of the stationary cam 45.

As best seen in FIG. 2, it will be noted that the stationary cam 45 is provided with a peripheral cam surface which is contoured to effect relative displacement of the piston head 43 within the measuring chamber 34 as the rotary turret head 33 is rotated in a counter-clockwise direction about the shaft 32.

In accordance with this invention, the piston head 43 connected to the respective piston rods 44 in each of the respective measuring chambers 34 is formed of a porous material which is rendered pervious to a gaseous or fluid medium, but impervious to the powdered material. Thus piston head 43 may be formed of any desirably foramous material that will enable the same to be rendered impervious to the powdered material but pervious to a gaseous medium, e.g., compressed air and the like. As shown, a portion of the piston rod 44 is provided with a longitudinally extending bore 47 in communication with the porous piston head 43, and which bore 47 is provided with a lateral opening 48 that communicates with an annular chamber 49 disposed immediately behind the piston head 43 and circumscribing the piston rod 44. Chamber 49 is formed with orifice 49A. Accordingly, the opening 48 in the piston rod 44 communicates through orifice 49A of chamber 49 with an orifice 50. This orifice 50 in turn bears upon the surface of a valve block 51 which valve block acts as a support block for the filling head turret through bearing surfaces 52 and which supports the shaft 32 and filling head assembly 33 through bearing 53. The valve block 51 in the embodiment illustrated has cut therein an arcuate vacuum chest or groove 54 which communicates with the orifice 50. The orifice 50 in turn is suitably connected to a vacuum pump or other source of negative pressure, by passageway 55, so that a vacuum can act through the orifice 50, and the foramous piston head 43. The arrangement is such that a vacuum is maintained on the measuring chamber 34 to effect the charging thereof from the time the chamber is passed under the hopper 35 until it is nearly in the position of discharge. This is effected by the vacuum chest or groove 54 which in turn is connected through a suitable vacuum lead 55 to a source of adjustable negative pressure.

As shown in FIGS. 1 to 3 and 25, the measuring chamber 34 with the piston head 43 retracted to loading position in passing through the hopper discharge and subjected to a negative pressure which is being pulled on the measuring chamber, causes the material 36 in the discharge end of the hopper to be drawn or sucked into the measuring chamber 34. The material so evacuated into the chamber 34 is maintained at an evacuated density proportional to the degree of negative pressure or vacuum being pulled on the chamber. As the measuring chamber 34 moves beyond the squeegee or doctor 39 in passing through the hopper 35, the end of the chamber 34 is dressed or wiped clean of any excess powder adhering thereto. Thus, as the rotating filling head 33 rotates beyond the doctoring blade 39, the measured charge contained in each of the respective filling chambers is rendered substantially uniform and accurate as the volume and density of the charged material is maintained constant through the successive filling operations.

Figure 4:
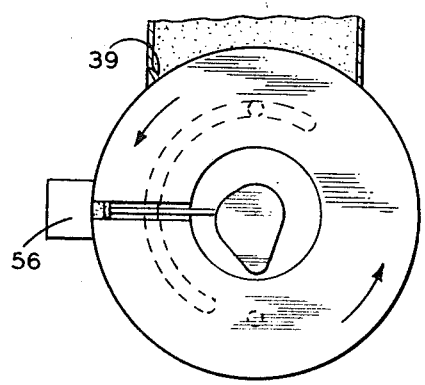
FIG. 4 is a view similar to that of FIG. 3 but illustrating the relative position of the component parts illustrating further compaction of the powder charge within the measuring chamber.
Figure 5:
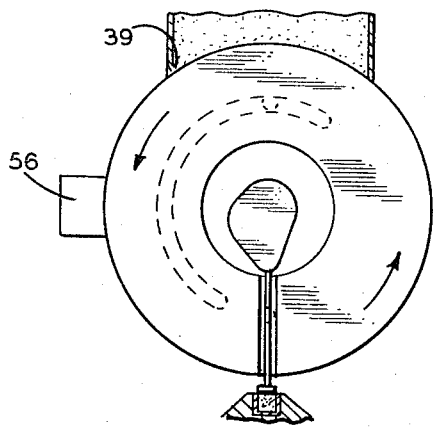
FIG. 5 is a view similar to that of FIGS. 3 and 4, but illustrating the compacted slug being discharged from the measuring chamber.
Figure 25:
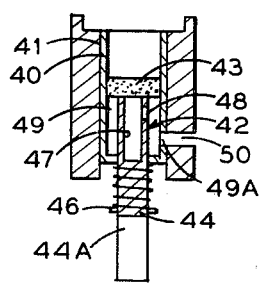
FIG. 25 is an enlarged detail view of the measuring chamber of FIG. 2.

In accordance with this invention as best seen in FIG. 4 there is disposed adjacent the filling head turret at a point beyond the passage of the measuring chamber from the hopper and in the direction of rotation of the filling head, an anvil means or compacting means 56 which is adapted to be disposed or moved into contiguous relationship with the filling head turret so that the anvil means defines a closure for the open end filling chamber 34 at a predetermined position beyond the hopper discharge. It is to be noted that the stationary cam 45 is formed so that when a measuring chamber 34 is disposed opposite the anvil means 56, the respective piston rods 44 riding the cam contour cause displacement of the piston head toward the anvil means 56 a predetermined amount so as to further compress the powdered charge between the anvil means 56 and the displaced piston head 43. In this manner the density of the powdered charge is increased to a predetermined value due to the compression imparted thereto and forms the charges into a powder slug having a density which is greater than the evacuated density of the charge material as it emerged from the hopper and sufficient to enable the slug to be handled as a substantial solid mass. Upon further rotation of the turret head 33 in the direction of rotation, it is to be noted that the piston head 43 is further advanced due to the cam contour so that in the discharging position of the metering chamber 34 as seen in FIG. 5, the piston had advanced to its maximum or protracted position thereby forcing the compacted powder slug ahead of it out of the chamber. However, it will be noted that during this movement of the piston 42, the negative pressure acting on the slug or charge is still maintained so that the charge or compacted powder slug is adhered to the end of the advancing piston head.

At the discharge position of the measuring chamber, there is provided a passageway or tube 57 which connects to a source of positive fluid pressure (not shown), as for example, compressed air. Accordingly, as orifice 50 of the filling head moves into or toward the discharge position, the orifice 50 lines up with and is placed in communication with passageway 57 which connects with the source of positive fluid pressure. Therefore, as indicated in FIG. 5 with the piston head advanced to its protracted position. the powdered slug which is otherwise retained thereto by the negative pressure acting on the piston head is positively separated therefrom by a pulse or jet of high-pressure fluid directed to the piston head as the chamber moves past the high pressure line 57. At the point of discharge suitable means are provided for positioning a container under the measuring chamber to receive the slug.

With the construction and method described, it is to be noted that the compacted powder slug is precisely positioned immediately above a container, adapted to receive the same, and further that it is positively ejected into such container with a minimum of dusting and/or contamination of the atmosphere and/or the machine. Also it is to be noted that by pre-compacting the measured charge of powder within the respective measuring chamber 34 prior to the discharge thereof, a given volumetric amount of powdered material at a given density can be reduced so that it may be accommodated in a container of a size which would not normally accommodate the given volumetric amount of powdered material in either its initial loose form or its evacuated density.

For ease of assembly and to avoid the necessary maintenance of tolerances during assembly, the shaft 32 about which the turret 33 rotates is mounted so that all end play is taken out by a spring means 58 which presses against a collar (not shown) pinned to the shaft 32 at one end, and pressing against the thrust bearing 59 at the other. Thus the spring assembly 58 holds the filling head turret tightly against the valve block 51, thus taking care of any wear and/or preventing loss of fluid pressure or vacuum.

It will be understood that a driving motor (not shown) is provided, which through necessary speed reducing can be operatively connected to the shaft to effect rotation thereof in timed sequence to a suitable containing feeding apparatus for successively delivering a series of containers sequentially through the discharging position of the respective chambers.

Figure 6:
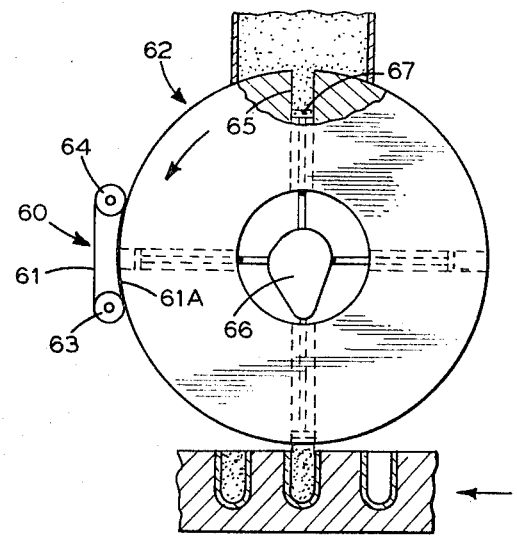
FIG. 6 is a view of a modified form of the invention.

In FIG. 6 there is illustrated a modified embodiment in which the anvil means 60 is illustrated as comprising an endless belt 61 and it is utilized in conjunction with a filling head turret 62 similar to that described with respect to FIGS. 1 and 2. In this form of the invention the anvil means 60 comprises an endless belt threaded about suitable sprockets or pulleys 63, 64, in which one flight 61A of the belt is disposed contiguous to or follows a portion of a circumferential portion of the circumference of the filling head turret 62. The belt may be disposed in either friction driving relationship with the periphery of the filling head turret 62 so that rotation of the filling head effects the drive of the endless belt 60 or the sprocket 63 or 64 about which the belt is threaded may be connected with synchronous driving relationship with the turret head 62. As previously described, it is to be noted that as the respective measuring chambers 65 approach the flight 61A disposed contiguous to the circumference of the filling head turret 63, that the stationary cam 66 effects the displacement of the piston head 67 toward the belt anvil 60 thereby causing the powdered charged material confined between the belt 60 and the piston 67 to be compressed a predetermined amount to define the necessary compacted slug powder. As the filling head turret 62 rotates beyond the endless anvil 60, the stationary cam 66 effects progressive movement of the piston head 67 toward its protracted position, whereupon the compacted slug of powdered material is ejected in the manner hereinbefore described with respect to FIGS. 1 and 2. The embodiment of FIG. 6 is such that continuous rotation of the turret filling head may be effected in an effort to enhance production.

Where the method and apparatus herein described is to be utilized for handling explosive or propellant type powders, the anvil means 56 or 60 are preferably formed of a resilient, conducting material such as rubber, neoprene, and the like. This is to minimize any danger of sparking or creation of an electric charge which may cause such explosive powders to ignite or detonate.

Figure 7:
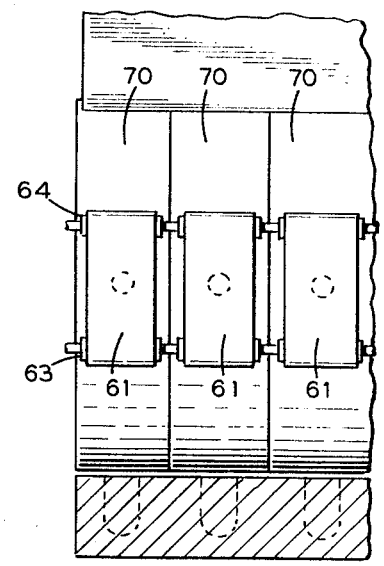
FIG. 7 is a view illustrating a bank of turret filling heads of the type shown in FIGS. 1 and 2.

FIG. 7 illustrates an arrangement wherein a plurality of filling head turrets 30A of the type described with respect to FIGS. 1 and 2 may be suitably journaled about the shaft to define a gang turret head. By so ganging a plurality of turret heads 30A as herein described it will be apparent that production of a given apparatus can be increased accordingly.

The measuring and dispensing equal predetermined amounts of powder in accordance with the method hereinabove described can also be satisfactorily attained by utilizing a gun-type measuring device. FIGS. 8 to 12 illustrate schematically how the method described herein can be practiced with a filling and dispensing gun type apparatus. The metering and dispensing gun 70 comprises essentially of an elongated tubular member or barrel 71 in which a piston means 72 is movably mounted for movement between a retracted loading position and a protracted discharging position. The piston means 72 comprises a piston head 73 formed of a porous material which is pervious to a gaseous medium, but impervious to the powdered material adapted to be handled thereby. As schematically illustrated in FIGS. 8 to 12 the piston rod 73A connected to the piston head 73 extends upwardly through the end 75 of the barrel 71. Accordingly, the barrel member to the rear of the piston head defines a chamber 76 which is alternately connected into communication with a vacuum pump 77 or other suitable device capable of drawing a vacuum on the chamber 76 and a source of high-pressure fluid, e.g., an air compressor 78. As seen in FIGS. 8 to 12 the tubular barrel member 71 is provided with an opening 79 which connects with a flexible tube or other suitable conduit 80. The conduit 80 is operatively connected to a valving means 81 for alternately connecting to the chamber 76 a source of negative pressure 77 or to a source of positive fluid pressure 78, as will be hereinafter described.

In operation, it will be noted that with the piston head 73 retracted to its loading position, as seen in FIG. 8, the open end of the barrel defines the measuring chamber 82 which is disposed into a supply 84 of bulk powdered material 83 which is desired to be measured and dispensed. In this position, the valve member 83 of the valve means is set so as to connect the source of negative pressure 77 to the conduit 80 connected to the tubular barrel member 71 to draw a vacuum thereon. Because the piston head 73 is pervious to a fluid, the vacuum or negative pressure acting thereon causes the powdered material in the supply 84 to be drawn into the measuring chamber 82. The charged gun is then withdrawn from the source of bulk powder supply and passed over a doctoring means to dress the end of the gun 71 as seen in FIG. 9. The doctoring means may comprise the edge of the bulk supply or the like. By doctoring the open end of the metering gun charged with a powdered material over a doctoring edge, the level of the charge is dressed so that equal predetermined amounts of powdered material corresponding to the volumetric capacity of the measuring chamber 82 are assured on each filling operation. The gun so charged and dressed is then moved to a smooth compacting surface 85 which may be formed of any suitable material. However, in the handling of high-explosive materials and gun powder it is desired that the compacting surface 85 be formed of a hard, conducting material, as, for example, conductive rubber or the like, thereby obviating the possibility of sparking and/or creating static electricity which could ignite the explosive powder contained within the metering chamber 82. With the end of the metering chamber disposed contiguous to the compacting surface 85 and still maintaining a negative pressure on the porous piston head 73, the piston head 73 is mechanically or otherwise advanced toward the open end of the measuring chamber 82 so as to compact the material charged therein between the piston head 73 and the compacting surface 85. (See FIG. 10.) Upon such compaction, the powdered material or charge within the metering chamber 82 is formed into a compacted slug of predetermined density, which density is greater than the initial evacuated density of the powder. The gun 70 is then moved to a position wherein it is desired to eject the compacted powder slug therefrom, as for example over the open end of a container 86. To effect ejection of the compacted powder slug from the measuring chamber 82, the piston head 73 is advanced to a protracted position thereof as noted in FIG. 11. To effect positive separation of the slug from the piston head 73, a jet of high-pressure fluid medium, as for example compressed air, is directed to the barrel portion 71 of the gun. This is attained by shifting the valve 83 to connect the high-pressure source 78 to the chamber 76. See FIG. 12. Since the piston head 73 is rendered pervious to such fluid medium, the pressure of the fluid flowing through the porous piston head will blow the powder slug from the end of the piston head 73 to effect positive separation. Such pulse of air will further purge the piston head of any powder particles. While the measuring gun described may be manually operated, it is preferred that the operation of such gun be automatically accomplished so as to enhance maximum production of a measuring and dispensing operation of a powdered material.

FIGS. 13 to 24 are directed to an apparatus 90 for effecting automatic operation of a measuring and dispensing gun 91 operating with the principle described with respect to FIGS. 8 to 12.

Figure 13:
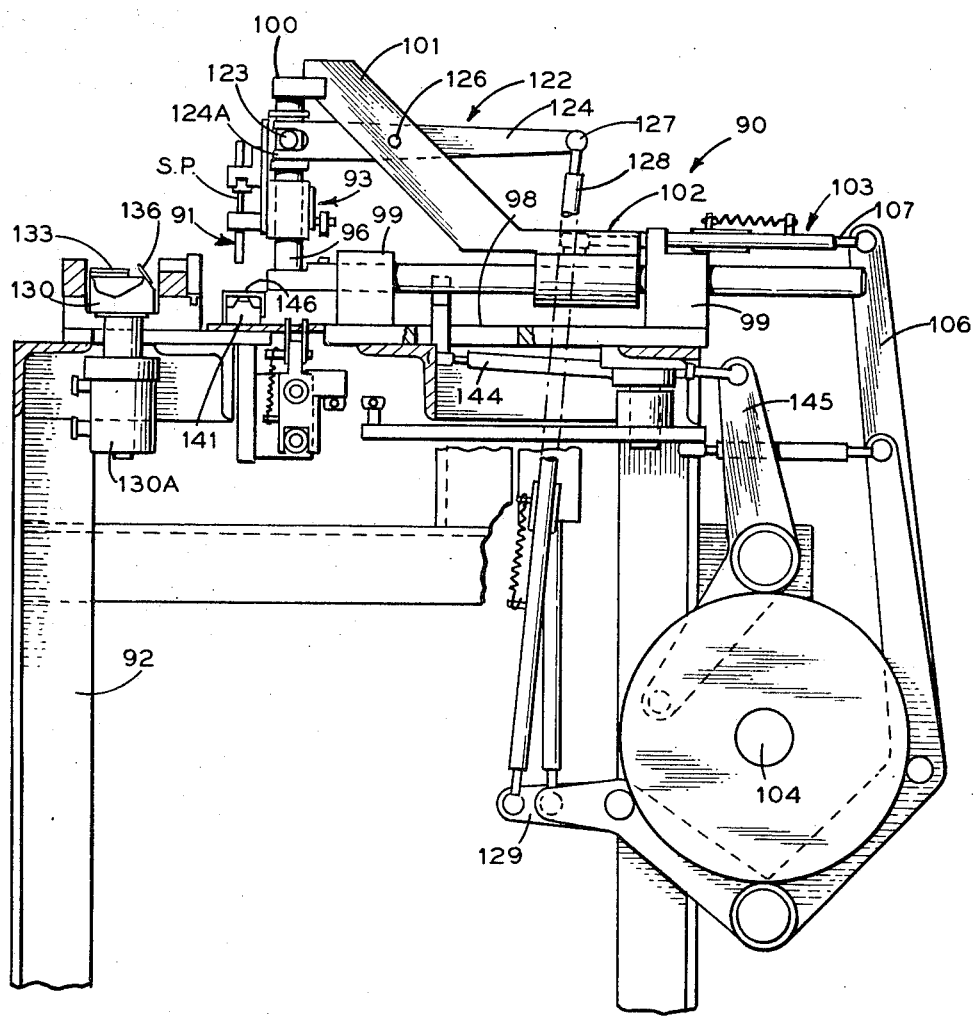
FIG. 13 illustrates a side elevation view of an apparatus in which automation of the metering gun principle as diagrammatically disclosed in FIGS. 8 to 12 may be performed to expedite a production type of loading operation.
Figure 23:
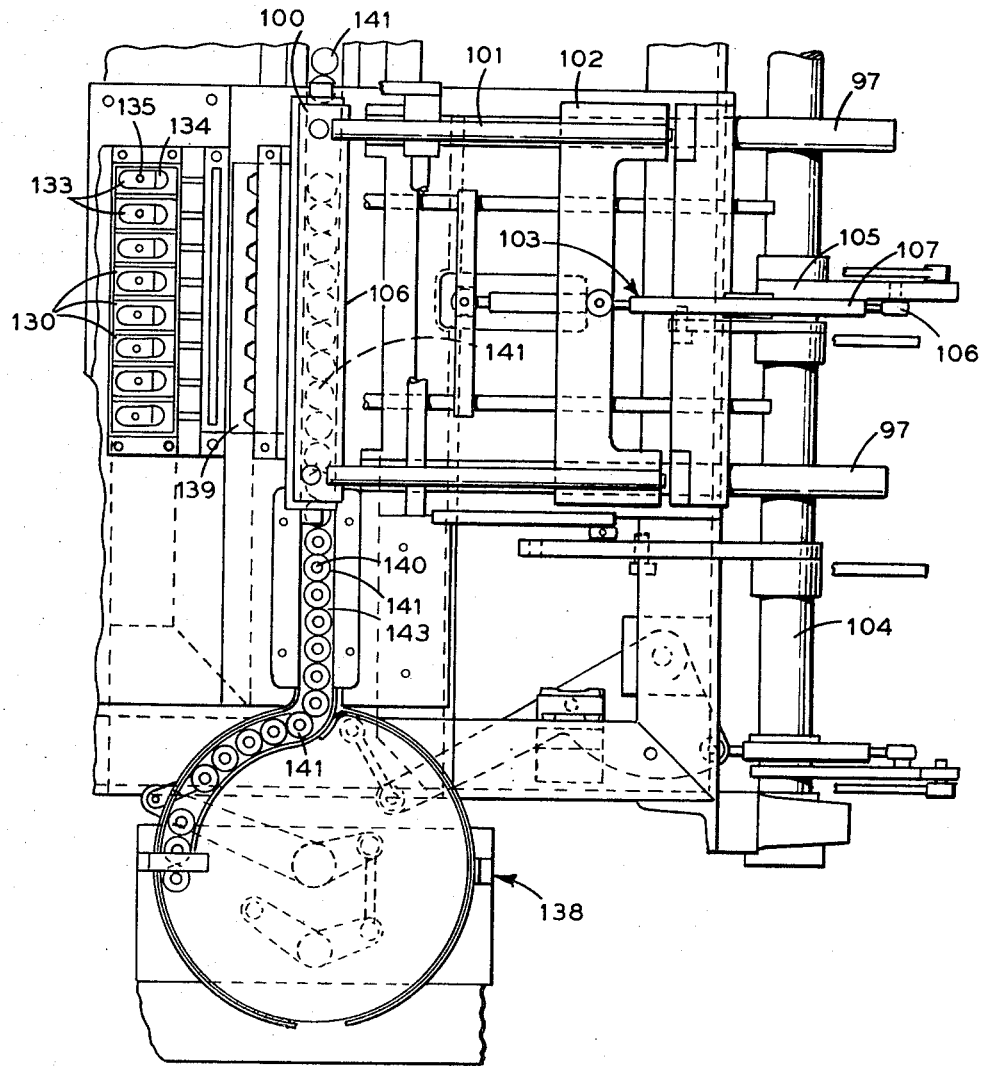
FIG. 23 is a plan view of the apparatus of FIG. 13.

As best seen in FIGS. 13 and 14, the apparatus 90 for effecting automatic operation of the measuring and dispensing guns 91 in accordance with the method herein described comprises a frame 92 on which a gun mount 93 is mounted for movement from a neutral or start position S.P. to a filling station F.P. through a doctoring position D.P. to a compacting position, C.P., to a discharging or ejection position E.P. and back to neutral or starting position S.P.

Referring to FIG. 24, the gun mount 93 comprises a pain of relatively movable cross bars 94, 95 which are slidably supported for limited vertical movement as a pair of upright post or stanchion members 96—96. The stanchions or upright ports 96 in turn are connected to the end of sliders 97 which are mounted for relatively horizontal movement over to table top 98 of the machine frame. Each of the respective sliders 97 is slidably mounted in suitable bearing means 99 fixed to the frame 92. Connected to the top of the respective stanchions 96 and extending therebetween is a tie bar 100. A pair of angled brackets 101 connect the tie bar 100 to a push plate 102 which extends between and connects to the respective sliders 97 for further bracing the upright stanchions 96.

A drive means 103 is operatively connected to the push plate 102 to effect reciprocable movement of the associated slider 97 and connected gun mount 93 between the respective positions or stations, S.P., F.P., D.P., C.P., E.P., and S.P. In the illustrated embodiment the drive means 103 comprises a cam shaft 104 rotatably journaled on the machine frame 92. Mounted on the cam shaft 104 is a contoured cam 105 for controlling the movement of an operating linkage 106, 107 operatively connected between the cam 105 of the cam shaft 104 and the push bar 102 of the sliders 97. Accordingly, the cam 105 is contoured to effect horizontal displacement of the sliders 97 and gun mounts 93 carried thereby in sequentially phased relationship to the other machine operations to be herein described.

Referring to the gun mount 93 shown in FIG. 24, it comprises an upper cross bar 94 slidably mounted with respect to the opposed support stanchions 96. In the illustrated embodiment the upper cross bar 94 is provided with opposed bearing collars 94A by which the bar 94 is slidably mounted on the stanchions 96. The lower cross bar 95 is similarly provided with bearing collars 95A for slidably connecting to the same the opposed stanchions 96. The lower cross bar 95 is also dependently supported from the upper cross bar 94 by a pair of spaced studs 108. The studs 108 extend freely through slightly oversized bores 108A formed in the lower cross bar 95, with the upper end of the studs 108 threadly engaged in a tapped hole 109 in the upper cross bar 94. As shown, a coil spring 110 is disposed about the respective studs 108 between the respective bars 94, 95 for normally maintaining the bars 94, 95 in spaced relationship. However, the arrangement is such that the respective cross bars 94, 95 are rendered relatively movable with respect to one another as will be hereinafter described. If desired, adjustable means 111 are provided for varying or adjusting the spacing between the cross bars 94, 95. The adjusting means as shown comprises a pair of screw studs 111 threaded through a tapped bore 111A extending through the tie bar 100, the ends of which are brought to bear on a bearing pad or means 112 connected to the upper end of the upper cross bar 94. Thus it will be noted that the spacing between cross bars 94, 95 can be varied depending on the particular setting of the adjusting screws 111. As will hereinafter become apparent, this adjustment is utilized to control the volumetric amount of powdered material to be dispensed by the respective gun means 91 carried on the gun mount. The gun mount 93 is also provided with stop means to limit relative movement between the respective cross bars 94, 95. As shown, the upper bar 94 is provided with spaced threaded stops 113 which engage bearings 114 to limit downward movement of the upper cross bar 94 relative to the lower cross bar 95 when the mount 93 is moved to the compacting station C.P. as will be described.

Connected to the gun mount 93 and carried thereon are a plurality of metering and dispensing guns 91 for picking up and dispensing measured charges of powdered material. In the illustrated embodiment a gang of eight guns 91 are carried on the gun mount 93, each of the guns 91 being similar or alike in construction.

Each gun 91 comprises an outer tubular barrel 114 which is suitably connected to a barrel bracket 115 connected to the lower cross bar 95. Slidably disposed within each barrel member 114 is a piston means comprising a piston rod 116 and a connected piston head 117. The piston head 117 is slidably disposed within the outer barrel member 114, and the connected piston rod 116 is suitably connected to a bracket 118 fixed to and carried by the upper bar 94 of the gun mount 93. Referring more particularly to FIGS. 19 to 22, the piston head 117 is formed of a porous material which is pervious to a gaseous medium, but impervious to the powdered material.

The piston rod 116 is turn comprises a tubular member having a diameter smaller than the internal bore of the barrel 114. As described with respect to FIGS. 8 to 12, the bore 119 of the piston and barrel is operatively connected to a source of negative pressure and a source of positive fluid pressure by a suitable flexible conduit (not shown). Accordingly the end portion of the barrel between the piston head 117 and the outer end 120 defines a measuring chamber 121 of a predetermined volumetric measure. By effecting relative adjustment of the gun mount bar 95 by turning adjusting screws 111, the piston rod 116, and connected head 117 carried by the bracket 118 connected to upper bar 94 are shifted accordingly within the barrel 114 to vary the size of the measuring chamber 121. It will thus be noted that for any given size of the measuring chamber 121 the distance between the barrel bracket 115 and piston bracket 118 will be a given distance, e.g., a distance X.

An operating means 122 is operatively connected to the gun mount 93 to effect vertical movement thereof along the respective upright stanchions 96. In the illustrated embodiment the upper bar 94 is provided with opposed trunions 123 which are respectively received in the bifurcated end portion 124A of an operating lever 124. The operating lever 124 in turn is fulcrumed about a suitable pivot 126 carried on brace 101. The other end of the lever 124 is connected by a suitable ball joint 127 to a connecting link 128, the latter having its other end connected to the end of a cam follower 129 which rides on a suitable contour cam connected to the cam shaft 104. The respective cams for operating the gun mount 93 horizontally and the cam for effecting vertical movement of the gun mount 93 and guns 91 carried thereby are timed to operate in a prescribed manner as will be hereinafter described.

In the loading or filling station F.P. of the machine there is disposed a row of receptacles 130, each defining a powder supply for each of the respective guns 91 carried by the gun mount 93. Each supply receptacle 130 includes a recess 131 for containing a supply of powder 132 material. Extending over the open end of the receptacle 130 is a flexible diaphragm 133 which forms a cover therefor. If desired, the diaphragm 133 may extend over only a portion of the supply recess 131. In this manner the recess 131 of each receptacle may be replenished with powder material through the uncovered portion 134. In accordance with this invention each diaphragm 133 is provided with an aperture 135 therein, the aperture 135 being smaller than the outside diameter of the measuring gun barrel 114. A vibrating means 130A is operatively connected to the supply.

Connected to one end of the aligned powder supply 130 is an upwardly extending doctoring blade 136, preferably formed of a resilient material, e.g., rubber.

Immediately ahead of the doctoring blade 136 there is provided the compacting station C.P. Essentially the compacting station C.P. comprises a surface 137 against which the ends of the respective gun barrels 114 are brought to bear after passing the doctor blade 136 that dresses the powder charge carried by each gun 91 during operation. In the event the apparatus 90 is set up to handle explosive types of powders and propellants, the compacting surface 137 is preferably formed of a resilient, conducting material, e.g., conductive rubber, neophrene, or the like. This is to reduce any tendency of sparking or friction which may cause ignition of such explosive powders. As will be described, the operation of the measuring gun 91 is such that the piston head 117 is displaced toward the compacting surface 137 a predetermined amount to pre-compact the powdered charge within the measuring chamber 121 of the gun 91. Such compaction forms a powder slug which can be handled as a solid.

Operatively associated with the meter gun apparatus 90 and disposed to one side of the machine is a container feeding mechanism 138 for arranging the containers, adapted to receive the powder charge, in a line and for advancing a series of such aligned containers to the powder filling apparatus 90. It will be noted that the container feeding apparatus is also operatively connected to the cam shaft 104 of the powder filling apparatus through an appropriate linkage drive.

Positioned on the bed or top 98 of the filling apparatus 90 is a locating bar 139 for receiving and properly positioning the containers at the filling station F.P. In the illustrated embodiment the container in fact comprises a capsule 140 supported on a pack or carrier 141, the latter functioning as a means for properly transporting the container or capsule 140 to the discharging station E.P. of the filling machine during operation.

A push bar 142 is operatively disposed on the top of the machine to advance the aligned container 140 from the initial aligned position I.P. (FIG. 14) thereof to the loading position F.P. of the machine. As seen in FIG. 14 the push bar 142 comprises an inverted channel portion 142A which is disposed in alignment with the feed channel 143 of the container feeding machine. The push bar 142 is operatively connected to a push link 144. The other end of the push link 144 is connected to a cam follower 145 which rides an appropriate cam journaled on the cam shaft 104. As shown, the web 146 of the push bar channel 142 is provided with an opening 147 through which the metering or measuring gun 91 is inserted in the final dispensing position E.P. thereof.

The operation of the filling machine described is as follows. The container 140 filling apparatus maintains a supply of containers and carriers 140, 141 in alignment and ready to be transported to the containing receiving station I.P. of the filling apparatus 90 as indicated in FIG. 14 wherein a series of eight carriers are disposed between the flanges of the push bar 142. From the container receiving station I.P. the push bar cam is contoured so that through the interconnecting linkage 144, 145 the push bar 142, in timed or phased relationship to the other movement of the machine, pushes the carriers and the containers 140, 141 supported thereon to the dispensing station E.P. as indicated in FIG. 14. In doing so the carriers 141 are moved against the locating bar 139 and are retained in position thereby until the container or capsule 140 thereon has been charged with a predetermined amount of powdered material from the respective guns 91.

As the carriers and containers 140, 141 are being so positioned the gun mount 93 is being horizontally transported to the portion wherein the respective guns 91 are disposed over the respective powder supply receptacles 130. This movement is effected by the cam and associated drive linkage 106, 107 for effecting horizontal movement of the slider 97.

When the guns 91 are disposed over the powder supply 130 the gun mount 93 is lowered so that the end of the gun barrel 114 extends through the aperture 135 in the diaphragm 133 covering the associated powder supply 130. At this time the chamber 150 back of the piston head 117 is subjected to a negative pressure. As a result the powder from the bulk supply 130 is sucked up into the measuring chamber 121. In this filling portion of the cycle, it is to be noted that the barrel 114 is moved into the powder supply 130 in a manner to prohibit the end of the barrel 114 from striking the bottom of the powder supply 130. See FIG. 19. Also it is to be noted that the distance between the piston rod mount 118 and barrel bracket 115 is maintained at a distance X. Also it will be noted that the barrel 114 in passing through the aperture 135 in the diaphragm 133 causes the encircling portion of the diaphragm to be displaced inwardly of the powder supply.

Upon charging of the respective measuring chambers 121, the gun mount 93 is retracted upwardly under the action of its drive means. In doing so the encircling portions of the diaphragm 133 are reversed. See FIGS. 16 and 17. As the barrel 114 is further retracted, the diaphragm 135 functions as a doctor means to dress any excess powdered material from the end of the measuring chamber 121 as the barrel assumes its normal position, the negative pressure being still maintained on the measuring chamber 121 to insure a uniform evacuated density of the powder charge therein and to maintain the charge within the chamber 121. In returning the charged gun toward the dispensing or discharging station E.P. the ends of the gun pass over a further doctor 136 to further dress the powder charge in the respective gun chambers 121.

With the guns 91 disposed over the compacting station C.P. the gun mount is again lowered under the influence of its operating cam and drive mechanism to a point where the end of the charge barrel 114 engages the compacting surface 137. In this portion of the cycle the upper bar 94 carrying the respective piston rods 116 continues to its downward movement after the movement of the lower barrel bar 95 has stopped. In so doing the piston head 117 is displaced toward the compacting surface 137 to further compact the measured powdered charge as indicated in FIG. 21. At this point it will be noted that the distance between the barrel bracket 115 and piston bracket 118 is less than X.

After compaction, the gun mount 93 is returned to the discharging station where it is again lowered to a point immediately adjacent the open end of the container or capsule 140. In doing so the piston rod 116 and connected piston head 117 are actuated for removement relative to the barrel 114 for pushing the compacted slug outwardly of the barrel; the negative pressure still being maintained on the slug of powder.

As the powder slug is being received within the container 140 a pulse of high pressure fluid is directed to the end of the porous piston head 117 to positively blow and separate the powder slug from the end of the piston.

The gun mount is then raised to its initial start position S.P. and the loaded capsules 140 and the carrier 141 supporting the same are returned to their initial container receiving position I.P. At this point the cycle is repeated, the newly arriving carriers forcing the filled capsules and their carriers 141 through discharge of the machine 90.

FIGS. 26 to 30 illustrate various modifications and improvements in means for further minimizing the doctoring error in rotary turret head filling machines.

Figure 26:
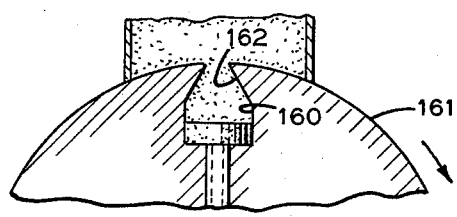
FIG. 26 is a detail fragmentary showing of a modified turret filling head for minimizing the doctoring error.

Referring to FIG. 26, the doctoring error of the rotary filling head adapted for use in a filling apparatus of the type described in U.S. Pat. No. 2,540,059 can be further reduced. This is attained by forming the measuring chambers 160 of the filling head turret 161 of the type disclosed in U.S. Pat. No. 2,540,059 with a tapering end portion 162 as shown in FIG. 26. By so tapering the end 162 of the respective chambers 160 inwardly, the cross-sectional area of the open end of the chamber is reduced to a minimum. Accordingly, the amount of excess material which can adhere to the end of the measured charge is reduced to a minimum. In all other respects the operation of the filling head turret 161 is similar to that disclosed and described in U.S. Pat. No. 2,540,059.

Figure 27:
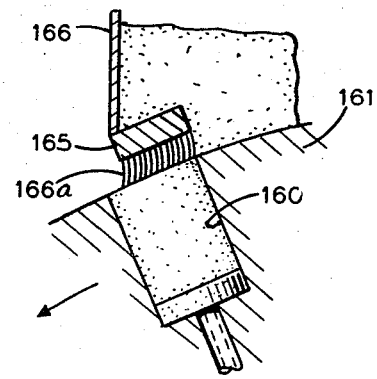
FIG. 27 illustrates a diagrammatic showing of a modified form of doctoring means for use with a turret filling head in accordance with this invention.

In the embodiment of FIG. 27, a brush means 165 is disposed adjacent the discharge end of the hopper 166, and the bristles 166a of the brush means function to doctor or dress the end of the measuring chamber.

Figure 28:
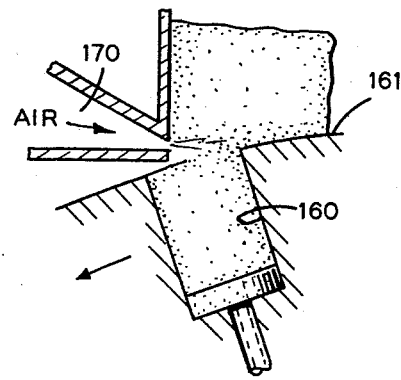
FIG. 28 is a diagrammatic showing of another modification of doctoring means as used with a turret filling head of this invention.

In FIG. 28 the dressing of the measuring chamber 160 as the turret head 161 rotates through the hopper is attained by a jet 170 of gaseous fluid, e.g., compressed air or inert gas or the like. As shown, the jet 170 of fluid functions as an air knife to prohibit any excess powdered material from adhering to the measured charge. In this manner the accuracy of the measured charge can be maintained.

Figure 29:
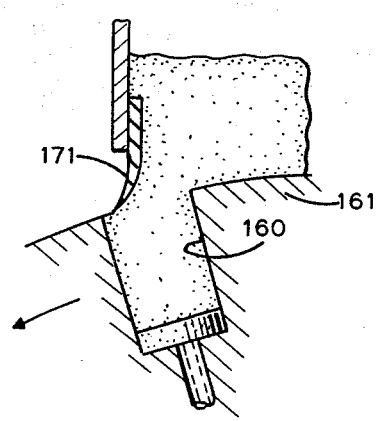
FIG. 29 is yet another diagrammatic showing of still another modified form of doctoring means.

In FIG. 29, the dressing of the measured charge in chamber 160 is attained by a flexible wiper blade 171 engaging the periphery of the turret head 161.

Figure 30:
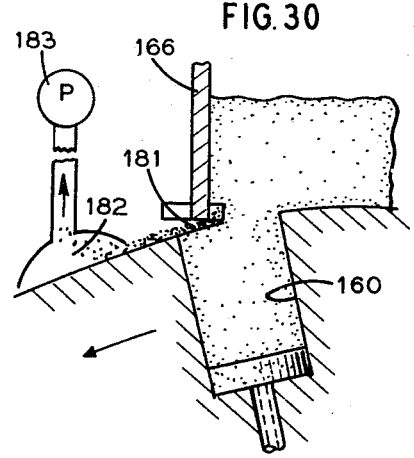
FIG. 30 is a diagrammatic showing of still another modified doctoring means.

In FIG. 30 dressing of the measured charge in the measuring chamber 160 of the turret head is attained by providing a slight spacing 181 between the end of the hopper 166 from which the turret head 161 emerges and the periphery of the turret 161. The spacing 181 is such so as to encourage a thin film of powdered material to form on the periphery of the turret head 161. As explained, the powder in the measuring chamber 160 is drawn into and maintained within the measuring chamber 160 by a negative pressure of predetermined force. The dressing in this form is thereby attained by disposing a nozzle 182 downstream from and adjacent the spacing 181 defined between the hopper 166 and the turret head 161 and connecting the nozzle 182 to a source 183 of negative pressure having a force which is less than that which acts on the measuring chamber 160. Thus, as the turret 161 rotates past nozzle 182 the vacuum created thereby tends to draw therein any loose powder extending beyond the periphery of the turret head and the measured charge carried thereby.

Figure 31:
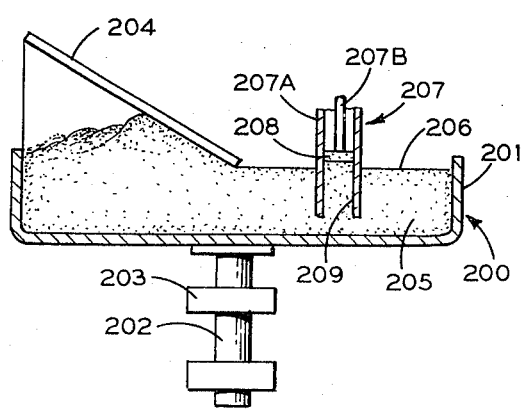
FIG. 31 is a schemmatic showing of a modified embodiment for attaining uniform powder density.
Figure 32:
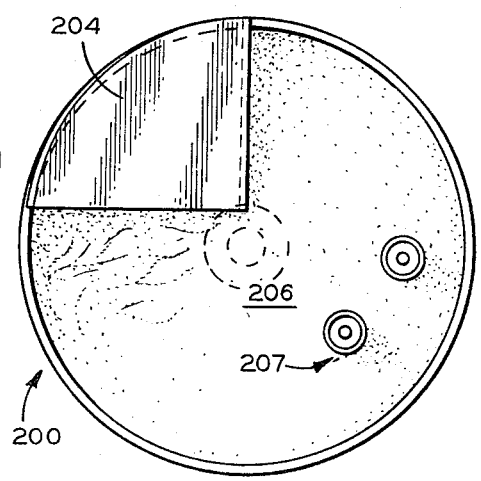
FIG. 32 is a plan view of FIG. 30.

FIGS. 31 and 32 illustrate another apparatus for attaining a measured amount of powder at uniform density. In this form of the invention the powder supply 200 comprises a receptacle 201 which is connected on the end of a spindle 202 rotatably journaled in suitable bearing 203. A motor means or other drive means not shown is connected to the spindle 202 to impart rotation to the supply receptacle 201.

A doctor-compressor blade 204 is suitably fixed and it is arranged to extend into the bowl of the receptacle. If desired, the inclination of the blade can be adjusted. In operation, the arrangement is such that the rotation of the bowl 201 relative to the doctor-compressor blade 204 is such that an area of the powdered material 205 as it passed under the blade is maintained smooth, and by applying a predetermined pressure on the blade 204 the powdered material passing thereunder is also compacted to a given density. Accordingly the powder in the supply bowl 201 emerging from under the doctor blade 204 is both smooth and compacted to a desired density, depending on the applied pressure of the blade.

To dispense the powder from the compacted area 206 of the powder in bowl 201, a metering chamber in the form of a gun 207 is inserted into the smooth and compacted zone 206 of the powder supply. In this form of the invention the gun comprises an outer tubular barrel 207A and a movable piston 207B. The head 208 of the piston may be formed of a porous material as herein described. In this form of the invention it is preferred that the gun be inserted into the compacted powder supply without applying the vacuum to the measuring chamber 209 of the gun, thereby permitting the powdered material to be picked up by friction. This is because the powder supply has been pre-compacted to a prescribed density by the doctor blade 204.

An alternate means for smoothing and compacting the powder supply in the bowl or supply is to impart a vibrating motion thereto.

To eject the powder picked up by gun 207, the piston is advanced to push the measured slug outwardly of the chamber 209. Also the slug may be removed by subjecting the slug to a stream of high-pressure fluid as hereinbefore described. Alternately the measured powder can be ejected from the measuring chamber 209 both by advancing the piston head to a protracted position and by admitting a pulse of high-pressure air to the protracted piston head as described.

Figure 33:
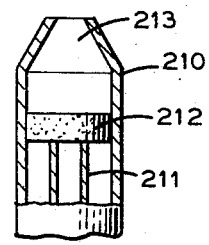
FIG. 33 is a modified meter gun formed with a tapered measuring chamber for reducing the exposed area of a given volume to a minimum to reduce doctoring error.

FIG. 33 shows the application of the tapered measuring chamber to a metering gun comprising a barrel 210 and piston 211. It will be noted that the piston may be fixed or movable relative to the barrel 210. If fixed, the piston head 212 defines a fixed base or bottom for the measuring chamber 213. If the piston head is rendered movable, the size of the chamber 213 is rendered adjustable. As described previously the piston head 212 is formed of a porous material. In this form of the invention the end of the barrel or the portion defining the one end of the chamber 213 is tapered inwardly to reduce the exposed cross-sectional area of the chamber of a given volume to a minimum. In this manner the doctoring error can be reduced.

It will be understood that with respect to the various embodiments herein described, ejection of the slug from the measuring chamber, e.g., with respect to FIGS. 8 to 12, can be attained by moving the barrel of the gun relative to a fixed piston, or by effecting movement of both the barrel and/or the piston relative to one another.

While the instant invention has been described in various embodiments, it will be understood that variations and modifications may be made without departing from the spirit or scope of the invention.

What is claimed is:

1. A powder filling apparatus for measuring and dispensing equal predetermined amounts of a powdered material comprising:
   means defining a measuring chamber,
   a piston means movably mounted in said chamber,
   said piston means including a foraminous piston head which is pervious to a gaseous medium and impervious to the powdered material to be measured,
   actuating means for effecting movement of said piston head between a retracted loading position and a protracted discharging position,
   means for applying a negative pressure on the piston head in the retracted loading position thereof to charge said chamber with a predetermined amount of powder,
   and means for compacting said powder within said charged chamber to form a slug prior to the discharge of said powder therefrom.

2. The invention as defined in claim 1 and including means for effecting separation of said compacted slug of powder from said piston head when in the protracted position thereof to release said slug from said chamber.

3. The invention as defined in claim 2 wherein
   said latter means comprises a source of positive fluid pressure,
   and means for directing said fluid pressure to said piston head when in the protracted position thereof to blow said slug free from said piston head.

4. A machine for filling a container with equal predetermined quantities of a powdered material comprising:
   a supply means adapted to contain a supply of said powdered material,
   a filling head having at least one measuring chamber formed therein,
   means for moving said measuring chamber between said supply means and a discharge position whereby said chamber is charged with powdered material at said supply means and said powdered material being dispensed from said chamber at said discharge position,
   a piston means movably mounted in said chamber, said piston means having a porous piston head formed of material which is pervious to a gaseous medium and impervious to said powdered material,
   activating means for moving said piston between a loading retracted position and a discharging protracted position,
   means defining a passageway connected in communication with the back side of said piston head,
   a source of negative fluid pressure and a source of positive fluid pressure operatively connected to said passageway,
   and a valving means for alternately applying a negative fluid pressure and a positive fluid pressure on said piston head whereby said valving means is operative to apply a negative fluid pressure on said piston head in the retracted loading position of said piston head to create a vacuum on said chamber whereby said chamber is charged by vacuum with a predetermined amount of powdered material from said supply means,
   and compaction means operatively associated with said charged chamber and activating means to effect compaction of the powdered material charged in said chamber as said piston head advances toward the discharge position to form a slug of said powder,
   and said valving means applying a positive fluid pressure on said piston head in the protracted position thereof to effect positive separation of said slug from said piston head.

5. The invention as defined in claim 4 wherein said compaction means comprises an anvil against which the chamber is moved so that the powder charged in said chamber is compacted between said anvil and said piston head as said piston head advances from a retracted loading position to a protracted discharging position.

6. The invention as defined in claim 5 wherein said anvil is formed of a resilient conductive material.

7. The invention as defined in claim 4 wherein said filling head comprises a rotating turret rotatably mounted for moving said chamber past said supply means whereby said turret is rotated between a chamber charging position and a chamber discharging position.

8. The invention as defined in claim 7 wherein said compaction means includes an anvil means disposed adjacent said filling head turret at a position intermediate said charging position and discharging position of said turret.

9. The invention as defined in claim 7 wherein said compaction means includes an endless surface disposed adjacent a circumferential portion of said turret intermediate the charging position and discharging position of said turret.

10. The invention as defined in claim 4 and including means for doctoring any excess powdered material from said chamber as said chamber is moved past said supply means.

11. A powder filling apparatus for measuring and dispensing equal predetermined amounts of a powdered material comprising:
    a measuring gun including means defining a measuring chamber,
    a piston means movably mounted in said chamber,
    said piston including a porous piston head which is pervious to a gaseous medium and impervious to a powdered medium,
    actuating means for effecting displacement of said piston head within said chamber between a retracted charging position and a protracted discharging position,
    said piston head defining the bottom of said chamber in the retracted loading position thereof so that said chamber can be charged with a quantity of powdered material substantially equal to the volume of the chamber defined thereby,
    means operatively associated with said chamber and with said actuating means for compacting the powdered material charged in said chamber as said piston head is moved a predetermined amount from its retracted loading position toward its protracted discharging position to form the powder charged in said chamber into a slug of powder,
    and means for directing a positive fluid pressure to said piston head in the protracted position of said piston head to effect positive separation of said powder slug therefrom,
    means connected to said piston head for drawing a negative pressure thereon when said piston head is in its retracted loading position whereby the negative pressure acting on said chamber draws the powder thereinto under a vacuum.

12. The invention as defined in claim 11 and including means for effectively doctoring any excess powdered material from said charged chamber.

13. A method for forming and dispensing a slug of powdered material comprising the steps of:
    positioning an open end measuring chamber having a movable piston therein adjacent a supply of powder material,
    charging said chamber with said powdered material by drawing a negative pressure thereon to suck the powder material thereinto whereby said powder material is contained therein by maintaining said negative pressure on said chamber,
    positioning said charged chamber adjacent an anvil means,
    effecting displacement of said piston within said chamber when said charged chamber is disposed adjacent said anvil for compacting said powder within said chamber between said anvil and said displaced piston to form a slug,
    and discharging said compacted powder slug from said chamber by further displacement of said piston at a point removed from said anvil.

14. The invention as defined in claim 13 and including the step of effecting separation of said slug from said piston in the discharging position thereof by changing the negative pressure operating on said slug to a positive pressure whereby the latter effects separation by blowing the slug free of said piston head.

15. The invention as defined in claim 13 and including the step of doctoring the excess powder extending beyond the opening of said chamber prior to positioning said charged chamber adjacent said anvil means.

16. A method of filling a container with a predetermined amount of a powdered material comprising the steps of:
charging an open end measuring chamber having a movable piston head therein by subjecting the chamber to a negative pressure whereby the powdered material is drawn into said chamber to define a slug having an evacuated density proportional to the degree of vacuum applied to said chamber,
effecting the discharge of said slug of evacuated density from said chamber by displacement of said piston toward the open end of said chamber to a protracted position, to force said slug through the open end of said chamber, and
separating said slug of evacuated density from said piston head in the protracted position by a pulse of positive fluid pressure applied to said slug.

17. The invention as defined in claim 16 and including the step of effecting compaction of said slug within said chamber to form a slug having a density greater than an evacuated density so that a predetermined quantity of powdered material, which in its normal free state exceeds the volumetric capacity of a given container, can be thereby deposited in such container.

18. The invention as defined in claim 17 whereby said compaction is attained by:
positioning an anvil adjacent said chamber to confine the slug of evacuated density between the piston and anvil, and
effecting a predetermined displacement of said piston toward said anvil to compact said slug of evacuated density.

19. A filling head for use in a powder filling machine having at least one measuring chamber having an open inlet end portion formed therein, the improvement wherein said measuring chamber is formed with sidewalls converging toward the open inlet end and a porous end wall spaced from said inlet end to define a chamber having its minimum cross-sectional area at the opened inlet end of said chamber, and vacuum means subjecting said chamber to a negative pressure through said porous end wall for drawing through said open inlet end a supply of powdered material whereby said reduced inlet open end minimizes the amount of excess powder adherring to the inlet end of the charged chamber during a charging operation.

20. A turret filling head for use in a powder filling machine having at least one measuring chamber formed therein, the improvement wherein said measuring chamber is formed with sidewalls converging toward the periphery of said turret filling head to define a chamber having its minimum cross-sectional area at the open end of said chamber to minimize the amount of excess powder adhering to the charged chamber during charging operation and means for applying a negative pressure on said chamber whereby said chamber is charged by drawing the powdered material thereinto.

21. A powder filling apparatus for measuring and dispensing equal predetermined amounts of powdered material comprising:
means for compacting a supply of powdered material,
a metering gun having an external barrel portion,
a piston means having a piston head disposed in said barrel defining a measuring chamber and whereby said piston and barrel are rendered movable with respect to one another,
said metering gun being insertable into said powder supply to pick up a measured amount thereby,
means for effecting relative movement of said piston and barrel portion to discharge said powdered material from said chamber,
said compacting means comprising a rotating powder supply,
and a doctor-compressor blade operating on the powder in said supply for compacting an area of said powder as it rotates past said blade.

22. A powder filling apparatus comprising:
an outer member defining a circumscribing wall portion of a chamber,
a piston member including a piston head disposed within said outer member, said piston head forming an end portion of said chamber,
means subjecting said chamber to a negative pressure to draw a predetermined measured amount of powdered material into said chamber,
and means for effecting relative movement of said members to effect ejection of the powdered material charged into said chamber.

23. The invention as defined in claim 22 wherein said means for effecting relative movement effects a precompaction of said powdered material within said chamber prior to effecting the discharge thereof.

24. An apparatus for successively filling a series of containers comprising:
a frame means,
a powder supply means on said frame means,
means operatively associated with said supply means for measuring and dispensing a predetermined amount of powdered material into a container,
said latter means including a gun means having a barrel member and a piston movably mounted within said barrel,
piston activating means for effecting relative movement of said piston between a retracted loading position, an intermediate compaction position and a protracted discharging position,
said piston including a porous piston head pervious to a gaseous medium and impervious to said powdered material, and a connected piston rod,
means for effecting displacement of said gun between said supply means and the container adapted to receive the powder,
means for positioning said gun into said powder-supply means, with the piston head in the retracted position to define a measuring chamber in the end of said barrel member,
means for subjecting said measuring chamber to a negative fluid pressure for charging said chamber with a predetermined quantity of said powdered material,
said gun displacement means moving said charged gun toward the container,
means disposed between said supply means and the container for effecting compaction of said powder charged in said measuring chamber to define a slug having a density greater than the evacuated density of said powder,
said piston activating means effecting displacement of said piston in said measuring chamber to eject said slug from said gun and into the container,
and means for separating said slug from said piston in the ejecting position thereof.

25. The invention as defined in claim 24 including means for doctoring the excess powdered material from said gun as it is withdrawn from said supply receptacle.

26. The invention as defined in claim 24 wherein said separating means comprises a source of positive fluid pressure directed to said measuring chamber when said piston is in the ejected position.

27. A powder filling apparatus for measuring and dispensing equal predetermined amounts of powdered material comprising:
means for containing a supply of powdered material,
a metering gun having an external barrel portion provided with an open end,
a piston means having a movable piston head disposed in a retracted position in said barrel portion to define a measuring chamber,
actuating means for effecting relative movement between said piston head and said barrel portion, said metering gun being adapted to be readily insertable into said powder supply with said piston head disposed in a retracted position therein so as to pick up a predetermined measured amount of said powdered material as said metering gun is inserted into said powder supply, means for compacting said measured amount of powdered material within said measuring chamber, and said actuating means effecting relative movement between said piston head and said barrel portion to effect discharge of said compacted material from said measuring chamber.

28. The invention as defined in claim 27 and including means for imparting a stream of high-pressure fluid on said piston head to effect positive separation of said powder from said piston head in the ejected position of said gun.

29. A machine for uniformly filling containers with powdered material, comprising in combination a vessel and means for producing a uniform level top surface of powder therein, at least one inverted measuring chamber, the cross section of the chamber being very much smaller than the cross section of the vessel, means for connecting said chamber at predetermined intervals to vacuum and gas under pressure, said chamber including as one of its walls a gas pervious but powder impervious material said wall being situated between the vacuum and the measuring chamber proper, whereby powder can be sucked up into the chamber by vacuum without being sucked through it.

means for moving said chamber periodically over the level top surface of powder and lowering it into the powder while connected to the source of vacuum whereby powder is sucked up filling the chamber, means for removal of excess powder sucked up beyond the mouth of the measuring chamber, powder ejecting means for effecting relative movement between said wall and said chamber, and means for applying gas pressure to the chamber to separate said material from said wall.

30. A method of filling containers with powder comprising the following steps:

establishing a level upper surface of powder, dipping a measuring chamber through said level upper surface and sucking up a predetermined volume of powder by vacuum into said measuring chamber, removing excess powder from the bottom opening of said chamber, and discharging the powder from said chamber by pushing the powder out therefrom and applying a positive gas pressure thereto.

31. A method according to claim 30 in which the powder is an explosive powder.

* * * * *